Oct. 28, 1952     W. S. PAWL     2,615,436
PLANETARY TYPE ENGINE
Filed Nov. 15, 1950
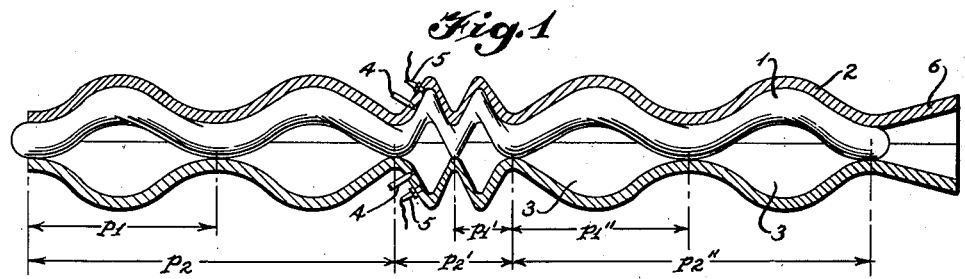
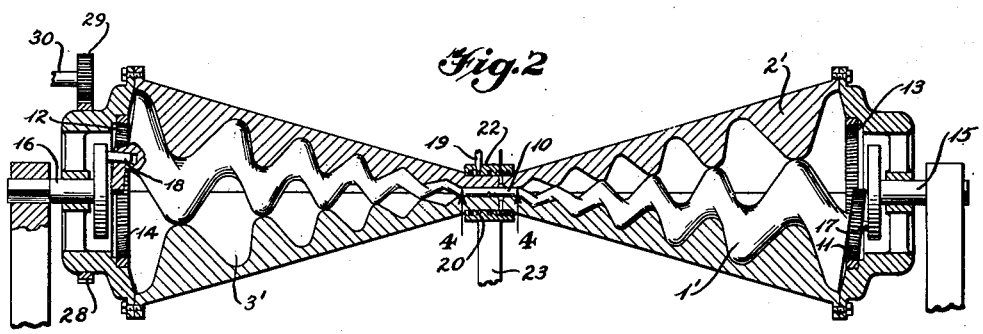
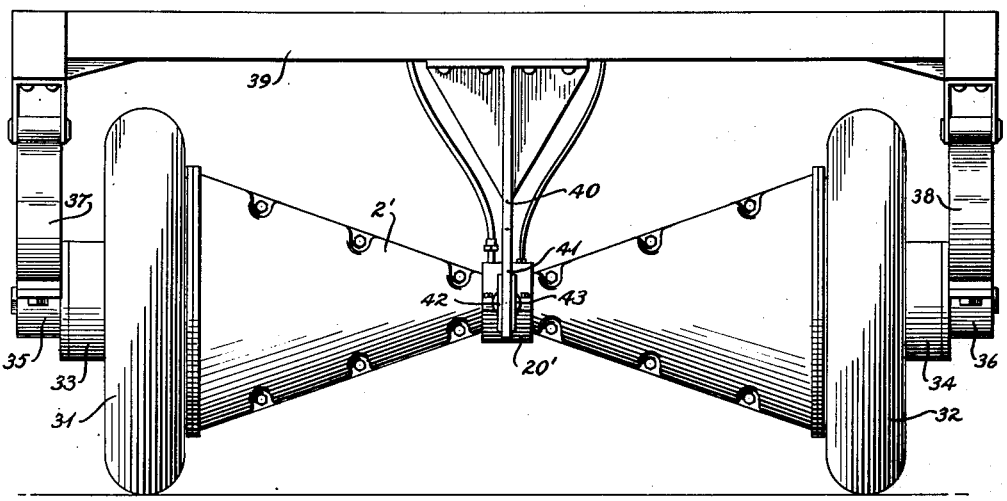
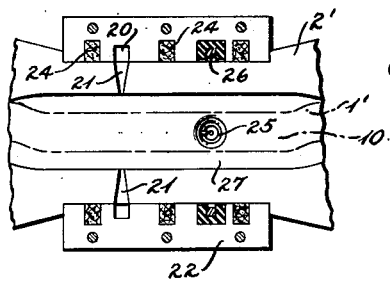
INVENTOR.
Walter S. Pawl Patented Oct. 28, 1952

2,615,436

UNITED STATES PATENT OFFICE 2,615,436

PLANETARY TYPE ENGINE

Walter S. Pawl, Hyattsville, Md.

Application November 15, 1950, Serial No. 195,892

8 Claims. (Cl. 123—8)

(Granted under the act of March 3, 1883, as amended April 30, 1928; 370 O. G. 757)

This invention relates to a novel type of internal combustion engines wherein the two main cooperating elements are relatively rotatable on different axes in a common plane. In this type of engines generically, the following relations of the two elements are essential: (1) the two axes rotate about each other, (2) the inner element simultaneously turns on its own axis in the opposite direction at the same rate, (3) in any spherical plane centered at the intersection of the two axes, the inner element has a circular cross-section with a diameter equal to the width of the cross-section of the opening formed in the external element, said opening section having circular ends of the same size as the circular section of the inner element centered at points spaced from the axis of the external element a distance twice the eccentricity of said axes, (4) the inner element and opening are both helically formed, but with different pitches and pitch diameters: the pitch of the inner element helix being half of that of the pitch of the opening helix, along any corresponding increments of the axes, and the pitch diameter of the inner element helix being equal to twice the eccentricity of said axes, while the helix of the opening is formed with no pitch diameter since it is formed about the axis of the opening, (5) the helix pitches or the diameter of the inner element, or both, are varied along the axes so as to reduce the volumes of the chambers formed at one end of the elements as they move away from said end during operation to obtain compression, fuel being then injected if not already mixed with the air entering the forming chambers at said end, the compressed charge being then ignited, the dimensions of the elements above mentioned are then further varied to cause an expansion of the chambers and provide the power torque to operate the engine.

One specific form of this type of engine which has been described in prior Patent No. 2,553,548 issued May 22, 1951, to H. D. Canazzi et al., for Rotary Internal Combustion Engine of Helical Piston Type, is limited to parallel axes which are in a common plane, which axes obviously intersect at infinity and any plane normal to these axes would therefore meet the definition of a spherical plane centered on the intersection of the axes. This specific form is fully described in the prior application without referring to the broader aspect herein disclosed, no mention being there made of the general essentials which are also being met by the other specific forms illustrated here, wherein the two axes may be any two different axes in a common plane so that they can intersect, and wherein the relatively planetary operations between any corresponding sections of the elements are performed in spherical planes centered on the intersection of the axes. Such intersection being at infinity in the case of parallel axes, the spherical planes referred to above, would be flat planes normal to the axes, as has already been illustrated by the form of the engine in the prior application.

It was discovered later that that form covers only one specific form of a broader concept of the invention which is based on spherical planetary operation of corresponding sections of the elements about a common center at the intersection of two different axes in a common plane.

It is the object of the present invention to construct an internal combustion engine having the above generic form of the two main cooperating elements, whereby a most efficient internal combustion operation may be obtained.

Another object is to provide an internal combustion engine having the above relations of parts with no expansion of the chambers after combustion, whereby the exhaust of the unexpanded products of combustion may be used to operate a turbine or as a jet through suitable nozzle construction for said exhaust.

A further object is to construct an internal combustion engine having the above relations of parts with only partial expansion of the chambers, whereby part of the energy of the combustion gases is used for operating a mechanical drive connection through partial expansion before exhausting the gases, and the remainder of the energy of the exhausted gases is used for jet power.

A further object is, more specifically, to provide an engine of the above type wherein the axes of the two elements are not parallel, but meet at some finite point, whereby to provide for variation of the chamber volumes without the necessity of altering the helix pitches.

A further, more specific, object is to provide an engine of the above type wherein the elements extend to both sides of the intersection of the two axes and are connected at said intersection by a nozzle or transfer space between the reduced chambers on the opposite sides of said intersection.

A further object is to adapt the above engine to stationary operation.

A further object is to adapt this engine to a vehicle drive.

Other and more specific objects will become apparent in the course of the following detailed description of the invention, which is illustrated in the accompanying drawings, wherein:

Fig. 1 shows the essential parts of one specific form of the invention,

Fig. 2 is a sectional view of another specific form and its adaptation to stationary power plant operation, Fig. 3 is an elevational view of a similar form adapted to a vehicle drive, and Fig. 4 is an enlarged sectional view of the connecting nozzle or transfer passage taken on the line 4—4 of Fig. 2.

The specific form of the invention shown in Fig. 1, which has been fully described in the prior application referred to above, consists of the two main relatively rotatable elements 1 and 2, 1 being the internal worm or helical piston and 2 being the external casing forming the helical opening for cooperation with the helical piston to provide overlapping closed chambers 3, which during rotation of the elements, are formed at one end of the engine, moved to the other end while progressively reduced in volume and then expanded, and exhausted and completely eliminated at the other end. This operation is made possible as a result of the structural form of the elements which have the general relations expressed earlier in this specification viz, (1) their axes rotate about each other; in this instance counterclockwise looking into the engine from the right or rear end, (2) element 1 rotates about its own axis simultaneously in the opposite direction: or clockwise, looking from the right, (3) in any spherical plane centered at the intersection of the axes—in this case, in any plane normal to the axes, since they are parallel and their intersection is at infinity— the element 1 has a circular cross-section equal in diameter to the width of the cross-section of the opening formed by the external casing 2, which cross-section has semicircular ends of the same radius centered at points spaced from the axis of casing 2 a distance twice the eccentricity of the two axes, (4) the inner element 1 and the opening formed by the casing 2 are both helically formed, but with different pitches and pitch diameters: the pitch of the helix of element 1 being half of that of the helix of the opening along any corresponding increments of the element axes, and the pitch diameter of the helix of element 1 being equal to twice the eccentricity of the axes, while the pitch diameter of the helix of the opening is zero since this helix is formed right on the axis of the opening, (5) the helix pitches are varied along the axes: the first two complete turns of element 1 have a pitch $p_1$, while the first complete turn of the opening has a pitch $p_2$ which is twice as great as $p_1$, for the next turn of the opening it has a reduced pitch $p_2'$ being twice as great as $p_1'$; then the pitches are increased to $p_1''$ and $p_2''$, $p_2''$ being twice as great as $p_1''$. Although, as illustrated $p_2''$ is shown substantially equal to $p_2$, it may be more desirable to make $p_2''$ longer or shorter with respect to $p_2$ to obtain more expansion or less depending on whether any or all the expansive energy is desired for other than mechanical drive by the engine, such as, for example, for jet power or gas driven turbine operation.

The same choice of power may also be made by cutting off a portion of the last turn of the opening in the casing 2; in other words, by structurally cutting off the engine anywhere within the last turn of the casing, so as to open the chambers before they are fully expanded, and exhaust them into a jet for jet power or turbine operation.

The fuel inlet 4 and ignition means 5 may be suitably positioned to introduce the fuel and ignite the mixture respectively in any portion of the combustion cycle.

The exhaust end of the engine may be provided with a suitable nozzle 6 for jet power or for increasing the efficiency of the exhaust of the engine, particularly if the engine is moving through the air to the left as viewed in Fig. 1. Obviously, in that case, suitable streamlining and inlet diffuser construction formed on the bearing supports for the casing, not shown, would be helpful.

Fig. 2 shows a complete engine adapted for stationary operation and is constructed according to the specific form in which the axes of the elements cross each other substantially in the middle of the engine, whereby a reduction in the operating chambers is provided without changing the pitches of the elements. The two portions of the helical piston 1' on opposite sides of the intersection of the axes are in this case connected by a bar member 10 for more rigid operation. The two portions could be made separate without affecting the operation. The ends of the helical piston 1' are provided with the gears 11 and 12 rigidly formed thereon, which mesh with the internal ring gears 13 and 14 formed in the ends of the casing 2'. These gears could be omitted but are deemed desirable to provide a more rigid structure and to relieve the bearing stresses between the elements during operation. The casing 2' is rotatably supported on stationary shaft bearings 15 and 16 at the opposite ends thereof, which shaft bearings support pin bearings 17 and 18 in the gears 11 and 12 respectively. Thus each element is rotated during operation on its own axis and the two elements rotate in a planetary manner with respect to each other. The chambers 3' are formed at one end of the engine and as they move through the engine they are reduced in volume thus causing compression and at the point of substantially highest compression fuel is introduced through fuel supply line 19 and through annular passage 20 to the passages 21 in the wall of element 2'. The fuel supply line 19 and annular passage 20 are formed in a stationary collar 22 which is mounted on stationary support 23. Seals 24 are provided in grooves in said collar to prevent leakage of fuel between the collar and casing 2'. Ignition means such as spark plugs 25 are provided in the wall of casing 2' and are supplied by high tension ignition current through the distributor element 26 also located in the collar 22. The compressed air and fuel being mixed in the transfer chamber 27 on each side of the bar member 10 are caused to ignite as they pass the spark plugs 25 whereupon their expansion occurs as the gases move with the chambers towards the other end of the engine. When the gases are substantially fully expanded the chambers are opened and exhausted into the air at the right end of the engine. It is obvious that suitable baffle means may be used at the air inlet as well as at the exhaust end of the engine for more efficient operation. The structure shown is merely by way of illustrating the arrangement of the main elements of the engine to produce operation.

The drive from this engine may be obtained in many different ways, only one of which is illustrated in Fig. 2, namely the gear 28 formed on the casing 2 which meshes and drives gear 29, the shaft 30 of which is the power takeoff shaft.

Fig. 3 illustrates an adaptation of a similar engine construction adapted to a two wheel drive for vehicles. Instead of the drive gears 28 and 29 the engine is mounted directly on the wheel axis of the vehicle in which the wheels 31 and 32 may be directly driven through an internal clutch on the same shaft and the whole assembly of the wheels and engine may be rotatably mounted in bearings 35 and 36 which are spring suspended by semielliptical springs 37 and 38 from the frame 39 of the vehicle. The collar 20' in this instance is held against rotation on the casing 2' by means of a fork member 40 rigidly mounted on the frame 39 and having its straight prongs 41 slidably mounted in slides 42 on opposite sides of the collar 20' in rotatably adjustable bearings 43, so as to permit the working of the collar angularly and up and down with respect to the frame 39 during motion of the vehicle over uneven territory.

The clutch used in the wheels may include a one-way clutch for each wheel to permit different speeds of turning of the wheels, when making a turn for example. Various known forms of clutch means and brake means may be adapted for use in this engine combination. No details of these elements are therefore believed necessary. The semielliptical springs 37 and 38 are any conventional type carriage springs, either single or multiple leaf, suspended from the frame by a spring bolt fixed relatively to the frame at one end of the springs and by a movable spring bolt mounted on a shackle pivotally joined to the frame at the other end of the springs in conventional manner.

Obviously many modifications in the form and construction of the essential parts of the engine may be made without departing from the spirit and broad scope of this invention, as defined in the appended claims.

The invention described herein may be manufactured and used by or for the Government of the United States of America for governmental purposes without the payment of any royalties thereon or therefor.

What is claimed is:

1. A planetary type engine comprising two relatively rotatable helical members, one within the other, having coplanar axes and cooperating to form a series of axially overlapping closed chambers therebetween, reduced in volume near the middle of the engine, the inner member having a helix pitch half as great as that of the outer member along any increments of the axes correspondingly spaced axially of the engine, the cross-sections of the members correspondingly spaced axially of the engine being circular for the inner member of a diameter equal to the width of the space in the outer member which is bounded by semicircular ends of the same radius as the circular section centered at points spaced from the axis of the outer element a distance equal to the helix diameter of the inner member, whereby a relatively planetary motion is obtained by the said members during operation, and the chambers are progressively moved from one end of the engine to the other while changing their volume correspondingly.

2. A planetary type engine as defined in claim 1 wherein the axes of the members are not parallel and therefore meet at some finite point.

3. A planetary type engine according to claim 2 wherein the helix pitches of both members are constant throughout the engine.

4. A planetary type engine according to claim 2 wherein the helix pitches of said members are reduced towards the middle of the engine for increasing the rate of compression per turn of said helices.

5. A planetary type engine as defined in claim 1 further characterized by having a planetary gear formed at the outer end of the inner member and an internal ring gear meshing therewith and formed at the corresponding end of said outer member, both gears being centered on the corresponding axes of said members and the planetary gear having a diameter double the spacing of said axes at said end of the engine.

6. A planetary type engine as defined in claim 1 wherein a drive gear is formed on said outer member, a driven gear meshing therewith and stationary bearing shafts for said outer member at the ends thereof alined with the axis of said outer member, a planetary gear formed at the end of the inner member coaxial therewith and having a diameter double the spacing of the axes at that point, an internal ring gear formed at the same end of the outer member coaxial therewith and meshing with said planetary gear and a fixed bearing shaft for said planetary gear mounted on the fixed bearing shaft for the outer member.

7. A planetary type engine as defined in claim 1 wherein the expansion of the chambers is carried out to provide reduction of pressure in the exhaust to substantially atmospheric pressure, whereby a maximum efficiency cycle of operation may be obtained.

8. A planetary type engine as defined in claim 1 wherein a portion of the expansion end of the engine is cut off to provide superatmospheric exhaust pressure, whereby the exhaust may be used for jet or turbine propulsion, while only a portion of the expansive energy is used for mechanical power transmission.

WALTER S. PAWL.

REFERENCES CITED

The following references are of record in the file of this patent:

UNITED STATES PATENTS

| Number | Name | Date |
| --- | --- | --- |
| 1,341,846 | Gollings | June 1, 1920 |
| 1,735,477 | Stuart | Nov. 12, 1929 |
| 2,553,548 | Canazzi et al. | May 22, 1951 |

FOREIGN PATENTS

| Number | Country | Date |
| --- | --- | --- |
| 695,539 | France | Sept. 30, 1930 |
| 85,331 | Sweden | Nov. 21, 1935 |
| 108,420 | Australia | Sept. 14, 1939 |